United States Patent
Kitatani

(10) Patent No.: US 9,728,201 B2
(45) Date of Patent: Aug. 8, 2017

(54) PLAYBACK APPARATUS, SETTING APPARATUS, PLAYBACK METHOD, AND PROGRAM

(71) Applicant: NEC CASIO Mobile Communications, Ltd., Kawasaki-shi, Kanagawa (JP)

(72) Inventor: Kenichi Kitatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/437,547

(22) PCT Filed: Oct. 11, 2013

(86) PCT No.: PCT/JP2013/077799
§ 371 (c)(1),
(2) Date: Apr. 22, 2015

(87) PCT Pub. No.: WO2014/069220
PCT Pub. Date: May 8, 2014

(65) Prior Publication Data
US 2015/0243294 A1    Aug. 27, 2015

(30) Foreign Application Priority Data
Oct. 31, 2012  (JP) .................................. 2012-240430

(51) Int. Cl.
*G10L 21/00* (2013.01)
*G10L 15/22* (2006.01)
(Continued)

(52) U.S. Cl.
CPC .............. *G10L 21/00* (2013.01); *G06F 3/165* (2013.01); *G09B 5/04* (2013.01); *G10L 15/005* (2013.01);
(Continued)

(58) Field of Classification Search
CPC ....... G10L 15/22; G10L 15/265; G10L 15/30; G10L 13/08; G10L 13/043; G11C 2207/16; G11C 7/16
(Continued)

(56) References Cited

U.S. PATENT DOCUMENTS 5,850,629 A    12/1998  Holm et al.
2002/0086269 A1  7/2002  Shpiro
(Continued)

FOREIGN PATENT DOCUMENTS

CN    1842831 A    10/2006
JP    S62-219066 A    9/1987
(Continued)

OTHER PUBLICATIONS

International Search Report for PCT Application No. PCT/JP2013/077799, mailed on Dec. 17, 2013.
(Continued)

*Primary Examiner* — Vu B Hang

(57) ABSTRACT

A playback apparatus includes: an acquiring unit that acquires auditory language data including data to be played back as a spoken voice; an analyzing unit that analyzes the auditory language data to output an analysis result; a setting unit that sets at least a portion of the auditory language data to a control portion to be played back at a set playback speed, based on the analysis result; and a voice playback unit that plays back the control portion as a spoken voice at the set playback speed.

16 Claims, 6 Drawing Sheets

(51) Int. Cl.
*G10L 15/00* (2013.01)
*G09B 5/04* (2006.01)
*G06F 3/16* (2006.01)
*G10L 21/043* (2013.01)
*G10L 21/057* (2013.01)
*G10L 15/26* (2006.01)
*G10L 13/10* (2013.01)

(52) U.S. Cl.
CPC ............ *G10L 15/22* (2013.01); *G10L 21/043* (2013.01); *G10L 21/057* (2013.01); *G10L 15/265* (2013.01); *G10L 2013/105* (2013.01); *H04M 2250/58* (2013.01)

(58) Field of Classification Search
USPC .................................. 704/270, 201, 231, 260
See application file for complete search history.

(56) References Cited

U.S. PATENT DOCUMENTS

| | | |
|---|---|---|
| 2003/0231208 A1 | 12/2003 | Hanon et al. |
| 2005/0048449 A1 | 3/2005 | Marmorstein et al. |
| 2006/0209076 A1* | 9/2006 | Maeng .................. G10L 21/003 345/473 |
| 2008/0189099 A1* | 8/2008 | Friedman .......... G06F 17/30772 704/8 |
| 2011/0184738 A1* | 7/2011 | Kalisky .................. G06F 3/167 704/260 |
| 2012/0016671 A1* | 1/2012 | Jaggi ....................... G10L 15/22 704/235 |
| 2012/0053710 A1* | 3/2012 | Lindahl .................. G11B 20/10 700/94 |
| 2013/0318253 A1* | 11/2013 | Kordasiewicz ......... H04L 65/80 709/231 |

FOREIGN PATENT DOCUMENTS

| | | |
|---|---|---|
| JP | 2002-132282 A | 5/2002 |
| JP | 2005-533301 A | 12/2003 |
| JP | 2007-504496 A | 3/2005 |
| JP | 2007-219141 A | 8/2007 |
| JP | 2009-004859 A | 1/2009 |
| JP | 2009-75280 A | 4/2009 |
| JP | 2010-002841 A | 1/2010 |
| JP | 2010-066422 A | 3/2010 |

OTHER PUBLICATIONS

Barry Arons: "Speech Skimmer: A System for Interactively Skimming Recorded Speech", ACM Transactions on Computer-Human Interaction, ACM, New York, NY, vol. 4, No. 1, Mar. 1, 1997, pp. 3-38, XP000884001, ISSN: 1073-0516. DOI: 10.1145/244754.244758.
Extended European Search Report for EP Application No. EP13852242.0 dated on Aug. 2, 2016.
Chinese Office Action for CN Application No. 201380055758.9 issued on Nov. 25, 2016 with English Translation.

* cited by examiner

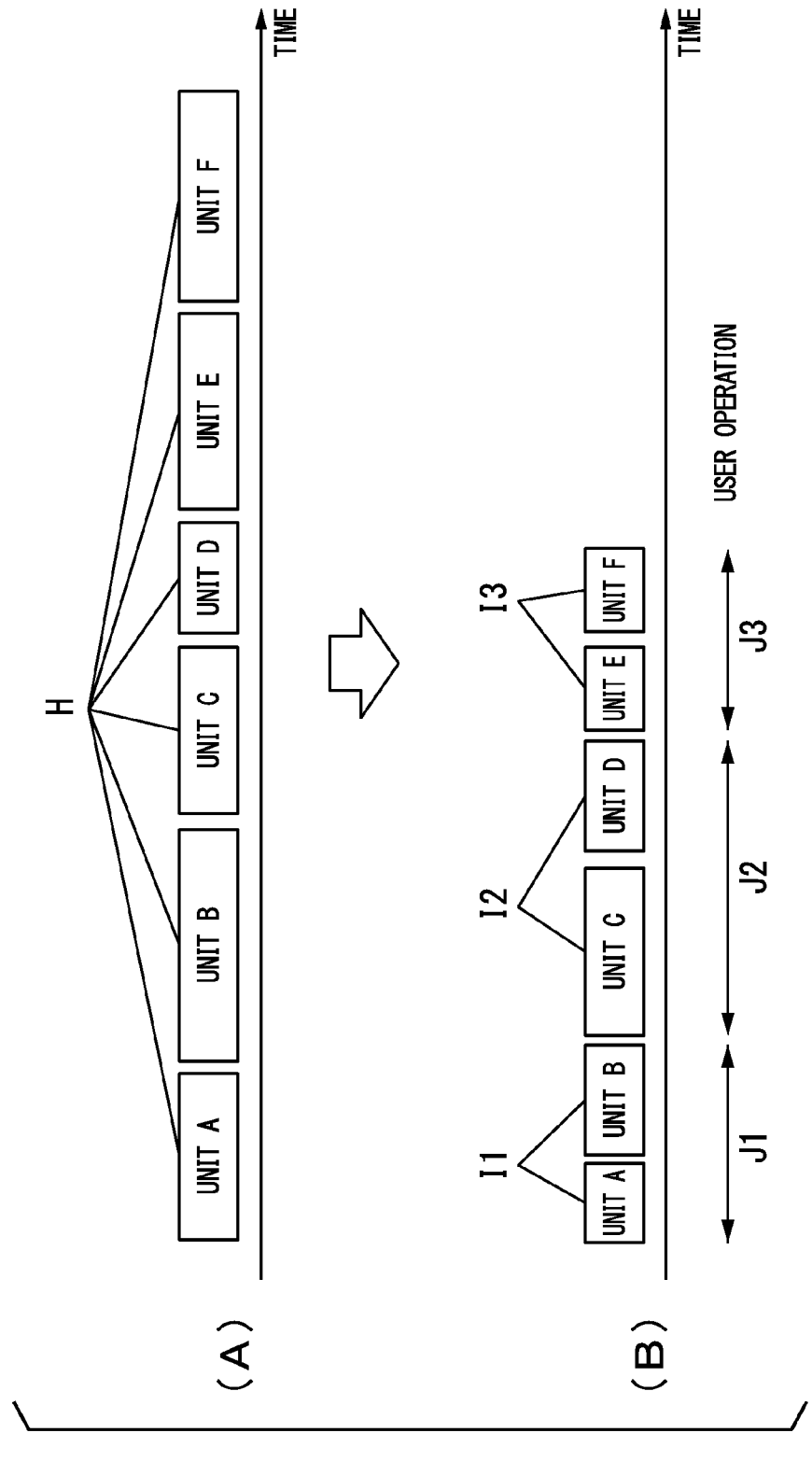

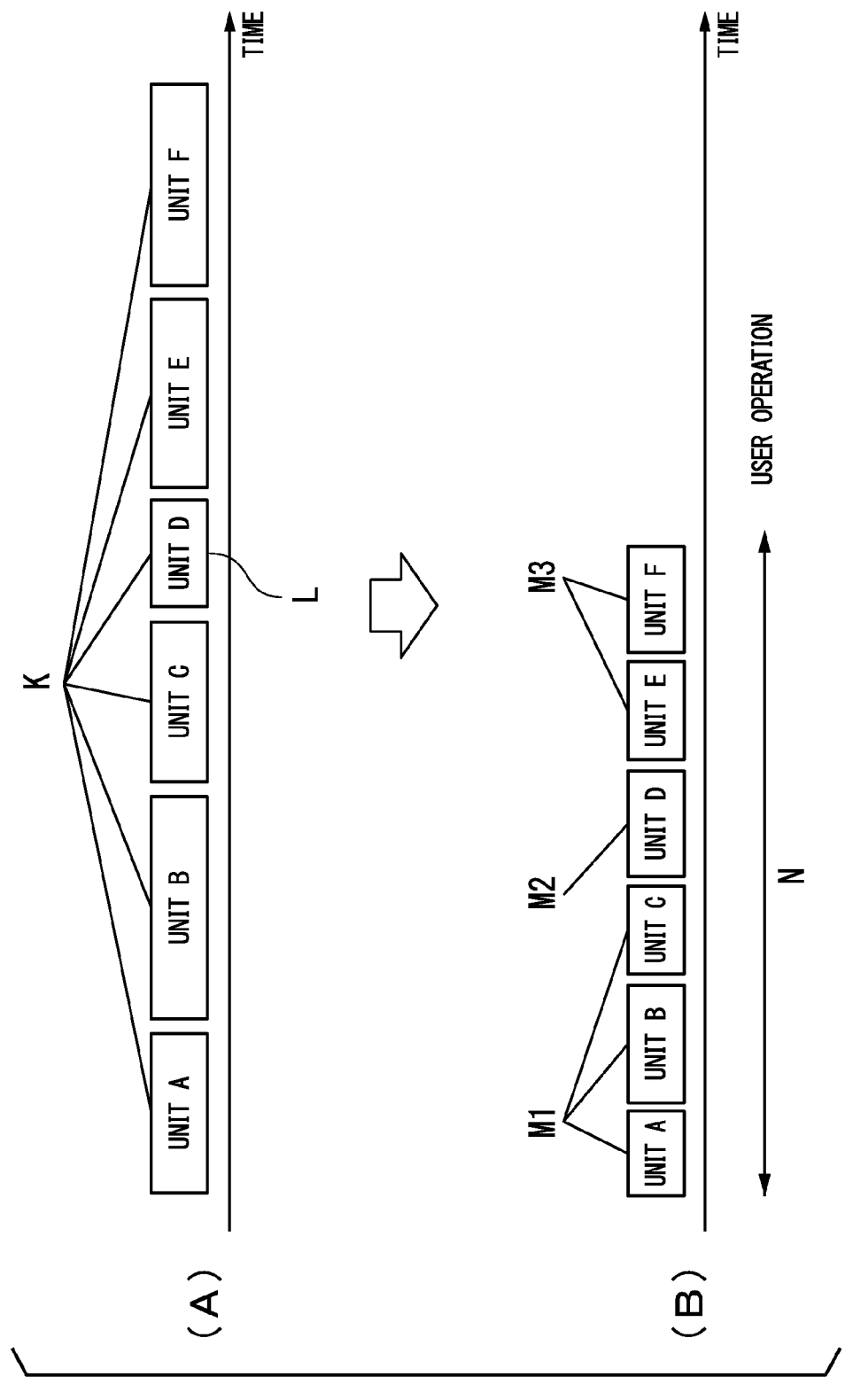

PLAYBACK APPARATUS, SETTING APPARATUS, PLAYBACK METHOD, AND PROGRAM

This application is a National Stage Entry of PCT/JP2013/077799 filed on Oct. 11, 2013, which claims priority from Japanese Patent Application 2012-240430 filed on Oct. 31, 2012, the contents of all of which are incorporated herein by reference, in their entirety.

TECHNICAL FIELD

The present invention relates to a playback apparatus for playing back auditory language data, a setting apparatus that sets the portion in which the playback speed is controlled, a playback method and a program.

BACKGROUND ART

As information media, there exist numerous visual information media (information media that provide information visually) such as books, newspapers and web pages using visual information transmission means such as text, drawings and photographs.

In the case of viewing a visual information medium, the user (the person using the information medium) can perform the sorting of information that is arranged two-dimensionally. For that reason, the user grasps the desired information in a comparatively short time. For example, the user, by scanning a page of a newspaper and selecting a desired article, can read only the selected article in detail.

For example, in the case of walking or driving an automobile, it is necessary to use one's sight in order to confirm the surrounding environment. For that reason, it is not possible to gaze at a visual information medium, or one should not gaze at a visual information medium. In this way, there are cases in which use of a visual information medium is not appropriate.

In cases in which use of a visual information medium is not appropriate, it is conceivable for a user to grasp information by using an auditory information medium (an information medium that audibly provides information) such as an audio player. In particular, by auditory information medium outputting sounds including utterances, much information can be provided to a user. Utterances here refer to sounds of language.

A number of technologies related to the audible provision of information have been provided.

For example, Patent Document 1 discloses technology for elongating voice and non-voice output time lengths, with voice playback having a greater sense of slowness compared to normal voice playback being the object.

Patent Document 2 discloses technology for changing the playback condition of voice data per unit voice data (for example, word) during playback of voice data.

PRIOR ART DOCUMENTS

Patent Document

[Patent Document 1] Japanese Unexamined Patent Application, First Publication No. 2009-075280

[Patent Document 2] Japanese Unexamined Patent Application, First Publication No. 2007-219141

SUMMARY OF THE INVENTION

Problem to be Solved by the Invention

Unlike visual displays such as text, drawings, and photographs, the output of sound is performed over time. Accordingly, when an auditory information medium provides information, a certain amount of time is required.

For example, the playback speed of audio data that an audio player plays back is generally specified. In the case of the audio player playing back the audio data from start to finish in accordance with this playback speed, a predetermined time stipulated as the playback time of that audio data is required. If the audio player speeds up the playback time, the time required for playback of the audio data becomes shorter. However, there is a limit to the playback speed in which a user is capable of grasping information. In particular, in the case of utterances being included in playback audio, when the playback speed quickens, the user no longer hears utterances as speech.

In this way, due to the output of sound being performed over time, time is required even when the user grasps the output of information that an auditory information medium provides to perform sorting of information.

As one example, the case shall be described of the user wanting to grasp information from audio data of unknown content (for example, audio data that a user listens to for the first time). In this case, in order to detect the location including the desired information, or in order to judge whether or not it includes the desired information in the first place, it is conceivable to listen to the audio data from start to finish while grasping the information. In that case, as described above, there is a limit to the playback speed at which a user is capable of grasping information. For that reason, there is a limit to shortening the time required for listening to the data. The content of audio data mentioned here refers to the information shown by the audio data.

The technology disclosed in Patent Document 1 is technology for playing back a voice with a strong sense of slowness when for example increasing the playback speed of a voice. That is to say, the technology disclosed in Patent Document 1 is not technology for changing the time required for playback. With regard to this point, in the technology disclosed in Patent Document 1, the user cannot perform sorting of the information by grasping in a shorter time the outline of information that the auditory information medium provides.

In the technology disclosed in Patent Document 2, in order to change the playback speed of voice data, it is necessary to set control data in advance for each unit voice datum (for example, each word), or register words in advance in a word list. In order to perform the setting of the control data or registration of words, the user needs to grasp in advance the content of the voice data. Accordingly, in the technology disclosed in Patent Document 2, the user cannot perform sorting of information by grasping in a shorter time the outline of information that the auditory information medium provides.

An exemplary object of the present invention is to provide a playback apparatus, a setting apparatus, a playback method, and a program that can solve the aforementioned issues.

Means for Solving the Problem

A playback apparatus according to an exemplary aspect of the present invention includes: an acquiring unit that acquires auditory language data including data to be played back as a spoken voice; an analyzing unit that analyzes the auditory language data to output an analysis result; a setting unit that sets at least a portion of the auditory language data to a control portion to be played back at a set playback speed, based on the analysis result; and a voice playback unit that plays back the control portion as a spoken voice at the set playback speed.

A setting apparatus according to an exemplary aspect of the present invention includes: an acquiring unit that acquires auditory language data including data to be played back as a spoken voice; an analyzing unit that analyzes the auditory language data to output an analysis result; and a setting unit that sets at least a portion of the auditory language data to a control portion to be played back at a set playback speed, based on the analysis result.

A playback method according to an exemplary aspect of the present invention includes: acquiring auditory language data including data to be played back as a spoken voice; analyzing the auditory language data to output an analysis result; setting at least a portion of the auditory language data to a control portion to be played back at a set playback speed, based on the analysis result; and playing back the control portion as a spoken voice at the set playback speed.

A program according to an exemplary aspect of the present invention causes a computer to execute: acquiring auditory language data including data to be played back as a spoken voice; analyzing the auditory language data to output an analysis result; setting at least a portion of the auditory language data to a control portion to be played back at a set playback speed, based on the analysis result; and playing back the control portion as a spoken voice at the set playback speed.

Effect of the Invention

According to an exemplary embodiment of the present invention, the user can perform sorting of information included in sound data of unknown content in a shorter time.

BRIEF DESCRIPTION OF THE DRAWINGS

FIG. 2 is an explanatory diagram that shows an example of a voice playback unit changing the playback speed on the basis of a user operation in the exemplary embodiment of the present invention.

FIG. 3 is an explanatory diagram that shows an example of the voice playback unit changing the playback speed in accordance with the setting of a playback speed control portion in the exemplary embodiment of the present invention.

EMBODIMENTS FOR CARRYING OUT THE INVENTION

Figure 1:
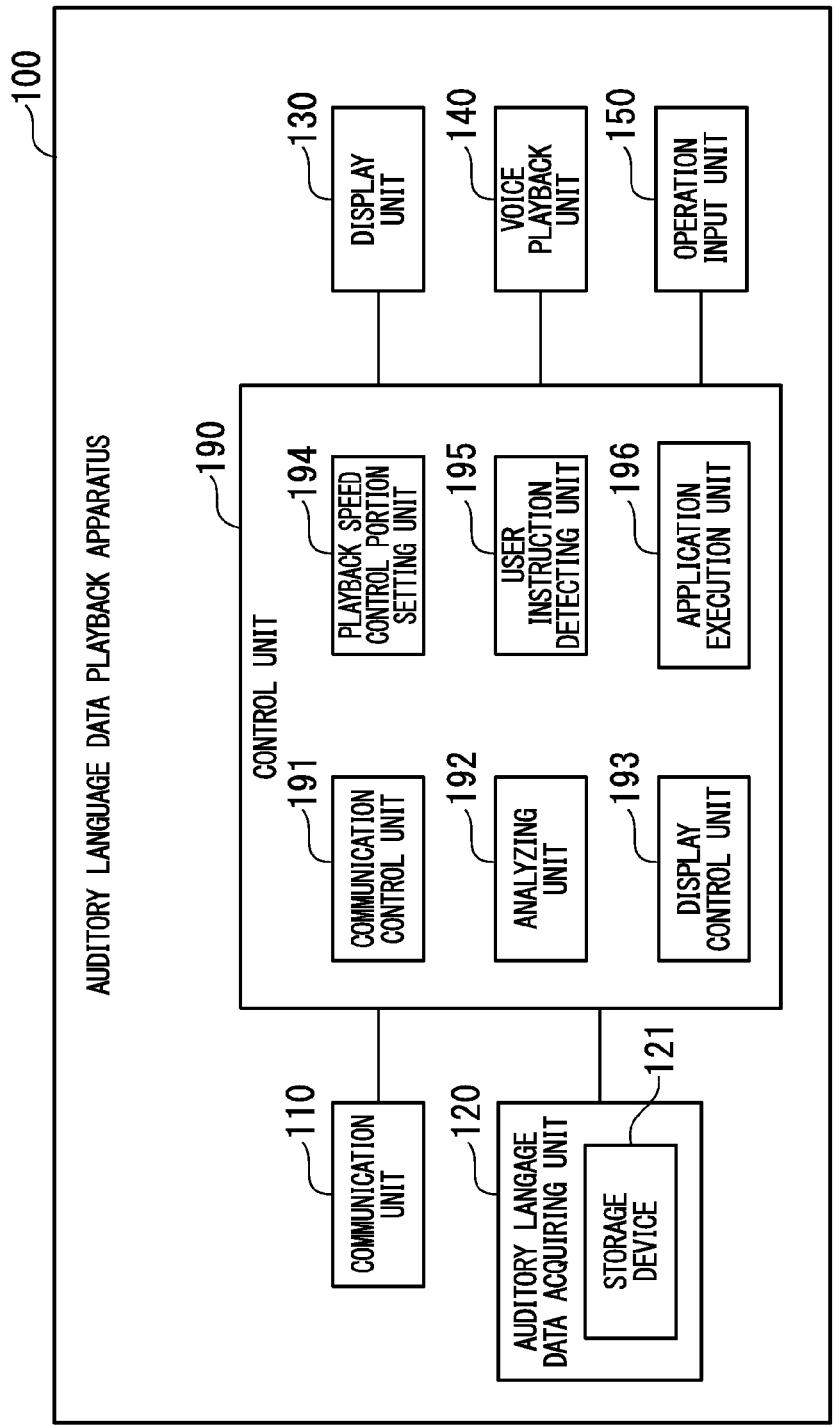
FIG. 1 is a schematic block diagram that shows the function configuration of an auditory language data playback apparatus in an exemplary embodiment of the present invention.

Hereinbelow, exemplary embodiments of the present invention shall be described. FIG. 1 is a schematic block diagram that shows the function configuration of an auditory language data playback apparatus in an exemplary embodiment of the present invention. In FIG. 1, an auditory language data playback apparatus (hereinbelow sometimes simply referred to as "playback apparatus") 100 includes a communication unit 110, an auditory language data acquiring unit (hereinbelow sometimes simply referred to as "acquiring unit") 120, a display unit 130, a voice playback unit 140, an operation input unit 150, and a control unit 190. The acquiring unit 120 includes a storage device 121. The control unit 190 includes a communication control unit 191, an analyzing unit 192, a display control unit 193, a playback speed control portion setting unit (hereinbelow sometimes simply referred to as "setting unit") 194, a user instruction detection unit (hereinbelow sometimes simply referred to as "detecting unit") 195, and an application execution unit 196.

The playback apparatus 100 plays back auditory language data and outputs a spoken voice. The auditory language data is data that can be played back as a spoken voice. The auditory language data may include sound data that indicates a spoken voice, and sentence data such as text data or word processor data. A spoken voice here is sound as an auditory expression of language. The spoken voice that the playback apparatus 100 outputs may be a voice comprised by the recording of a voice uttered by a person, or a synthesized voice.

The user of the playback apparatus 100 (hereinbelow simply referred to as "user") acquires information by listening to the spoken voice that the playback apparatus 100 outputs.

Hereinbelow, the case of the playback apparatus 100 being a portable terminal apparatus (a portable telephone or a smartphone) shall be described as an example. However, the application range of the present invention is not limited to a portable terminal apparatus. The playback apparatus 100 may be an audio player, a game machine, a personal computer (PC), or personal digital assistants (PDA) capable of playing back auditory language data.

The communication unit 110 performs communication by connecting to a mobile phone network (a communication network that a communication carrier provides to mobile terminal devices).

The acquiring unit 120 acquires auditory language data. Specifically, the storage device 121 that the acquiring unit 120 includes stores auditory language data. The acquiring unit 120 acquires auditory language data by reading out auditory language data from the storage device 121.

The method in which the acquiring unit 120 acquires auditory language data is not limited to the method of reading out auditory language data from the storage device 121. As this method, it is possible to employ various methods of acquiring auditory language data in a manner allowing the playback speed to be varied. For example, the acquiring unit 120 may connect to an external storage device and read out auditory language data from that external storage device.

The voice playback unit 140 has a speaker and outputs sound. In particular, the voice playback unit 140 outputs a spoken voice by playing back auditory language data in accordance with the setting of the setting unit 194. The setting unit 194 sets the playback speed control portion (hereinbelow sometimes simply referred to as "control portion") in the auditory language data. This control portion denotes the portion that should be played back in accordance with a predetermined control rule relating to playback speed.

When playing back auditory language data, the voice playback unit 140 plays back the portion set to the control portion in accordance with a predetermined control rule relating to playback speed. The voice playback unit 140 plays back the portion of the auditory language data that has not been set to the control portion at a playback speed corresponding to a user instruction.

As the predetermined control rule relating to the playback speed, it is possible to apply various control rules. For example, the control rule that is applied to the control portion may be a rule of playing back at a predetermined playback speed, or may be a rule that playback should be performed at a playback speed of half the playback speed that the user instructs.

Referring to FIG. 2 and FIG. 3, a description shall be given for the playback speed at which the voice playback unit 140 plays back auditory language data.

FIG. 2 is an explanatory diagram that shows an example of the voice playback unit 140 changing the playback speed on the basis of a user operation. FIG. 2 shows an example of the case of a control portion not being set.

Portion (A) of FIG. 2 shows a setting example of the playback speed of auditory language data. In portion (A) of FIG. 2, the auditory language data is split into units A to F. A playback speed is set for each unit.

A unit here is a grouping that is a division of auditory language data based on linguistic meaning. As a unit, it is possible to use a word unit at various levels, such as a word, phrase, sentence, or paragraph. As a unit, units other than units of words may also be used, such as having two sentences serve as a single unit, or having auditory language data divided at every given time serve as a unit.

The playback speed that is set here indicates the playback speed to serve as a standard. The voice playback unit 140 performs playback at this playback speed that is the standard when playback at standard speed (hereinbelow referred to as "standard playback") is instructed. In the example of FIG. 2, as an initial setting, the same playback speed is set for each of the units A to F. The line from the reference symbol H to each of the units A to F shows that the playback speed is set for each unit.

The method of setting the playback speed of auditory language data is not limited to the method that performs the setting for each unit as shown in portion (A) of FIG. 2. It is possible to use as the setting method of the playback speed of auditory language data various methods that enable acquisition of the playback speed when the voice playback unit 140 plays back auditory language data at the standard speed. For example, in the case of the auditory language data being sound data, the playback speed of the entire auditory language data may be indicated by the standard of that sound data. In the case of the auditory language data being sentence data, in the function of reading out the sentence data that the voice playback unit 140 executes, a standard reading speed may be set that is common to every sentence data.

Portion (B) of FIG. 2 shows an example of the playback speed when playing back auditory language data. In portion (B) of FIG. 2, each unit is played back at a playback speed corresponding to a user operation. Among examples of user operations, "listen properly" and "half listen" are included. "Listen properly" is a user operation that instructs standard playback. Also, "half-listen" is a user operation that instructs high-speed playback. High-speed playback here is a user operation that instructs playback at a specified playback speed that is faster than that during standard playback, such as for example three times the standard playback speed. In portion (B) of FIG. 2, the reference symbols J1 and J3 show that the user has set "half-listen" for units A, B, E and F. The reference symbol J2 shows that the user has set "listen properly" for units C and D by a setting change during playback. In portion (B) of FIG. 2, the reference symbol I1 shows that high-speed playback (voice small) has been set for units A and B. The reference symbol I2 shows that standard playback (voice large) has been set for units C and D by a setting change during playback. The reference symbol I3 shows that high-speed playback (voice small) has been set for units E and F.

The user, by selecting high-speed playback by the user operation of "half-listen", causes the playback apparatus 100 to play back all of the auditory language data in a shorter time to be able to detect a location that includes the desired information. The user that has detected the location including the desired information obtains the desired information by causing the playback apparatus 100 to play back the location at standard speed.

In the case of the example of FIG. 2, the auditory language data is made to be played back at high speed by the playback apparatus 100 in sequence from the initial unit A. The user that has listened to the spoken voice that has played back unit C, by recognizing that unit C is the location including the desired information, instructs standard playback to the playback apparatus 100. The user in the example of FIG. 2 instructs the playback apparatus 100 to perform standard playback of unit C and unit D, and thereby can acquire information from these units.

Upon the detecting unit 195 detecting a user instruction to lower the playback speed, the voice playback unit 140 winds back the playback position from the current playback position and starts playback of the auditory language data from the rewound position at the lowered playback speed. More specifically, upon the detecting unit 195 detecting a user instruction to lower the playback speed, the voice playback unit 140 winds back the playback position to the beginning of the unit that includes the current playback position. Moreover, the voice playback unit 140 starts playback of the auditory language data from the beginning of the unit at the lowered playback speed.

For example, in the example shown in portion (B) of FIG. 2, during high-speed playback of the unit C, the user instructs standard playback by inputting the instruction "listen properly" to the operation input unit 150. In response to this instruction, the voice playback unit 140 winds back the playback position to the beginning of the unit C, and performs standard playback from the beginning of the unit C.

The user, having determined that the desired information is contained in unit C by listening to the spoken voice that has played back the unit C at high speed, would normally then instruct standard playback midway through unit C. However, in the case of the voice playback unit 140 performing standard playback from midway through a unit, such as midway through a sentence or midway through a word, the user cannot acquire the desired information.

Therefore, the voice playback unit 140 winds back the playback position to the beginning of the unit, and performs standard playback from the beginning of that unit. For that reason, the user easily acquires the desired information.

As another method, playback may also be performed in the following manner. That is, when the detecting unit 195 detects a user instruction to lower the playback speed, the voice playback unit 140 winds back the playback position to a position reaching back to even before the beginning of the unit that includes the present playback position. Moreover, the voice playback unit 140 plays back the auditory language data from the reached-back position at a reduced playback speed.

A reached-back position here indicates a location to be played back at an earlier time, in the case of the entire auditory language data being played back continuously.

A concrete example shall be described referring to portion (B) of FIG. 2. The operation input unit 150 receives from the user an instruction of "listen properly" during high-speed playback of the unit C. In response to that instruction, the detecting unit 195 detects standard playback. Then, the voice playback unit 140 winds back the playback position to a position midway through the unit B, going back a predetermined time (for example, 5 sec. of time during standard playback) before the beginning of the unit C. Moreover, the voice playback unit 140 performs standard playback of the auditory language data from that position midway through the unit B.

Thereby, the user can grasp the relation between the unit that includes the desired information (for example, unit C) and the previous unit (for example, unit B), and therefore more easily acquires the desired information.

However, the process of the voice playback unit 140 winding back the playback position and then playing back the auditory language data at a lowered playback speed is not essential. Accordingly, when a user instruction to lower the playback speed is performed, the voice playback unit 140 may also lower the playback speed to perform playback as is (for example, perform standard playback) without performing rewinding of the playback position.

In the example of portion (B) of FIG. 2, the voice playback unit 140 performs standard playback at a comparatively high sound volume, and performs high-speed playback at a comparatively low sound volume. A comparatively high sound volume is a sound volume that is greater than the standard sound volume. A comparatively low sound volume is a sound volume that is less than the standard sound volume.

Thereby, when the user is searching for the location that includes the desired information by making the playback apparatus 100 perform high-speed playback of the auditory language data, the risk of the generated voice that is played back jarring the ears of the user or others in the vicinity can be lowered. Moreover, by the voice playback unit 140 performing playback at a comparatively high sound volume of the location that includes the information the user desires, the user easily acquires the desired information.

However, a process in which the voice playback unit 140 performs standard playback at a comparatively high sound volume and performs high-speed playback at a comparatively low sound volume is not essential. The voice playback unit 140 may also perform standard playback and high-speed playback at the same sound volume.

As another method, the voice playback unit 140 may also perform high-speed playback at a greater sound volume than during standard playback. Thereby, during high-speed playback the user can easily detect the location that includes the desired information.

FIG. 3 is an explanatory diagram that shows an example of the voice playback unit 140 changing the playback speed in accordance with the setting of a control portion. Portion (A) of FIG. 3 shows a setting example of the playback speed and control portion of auditory language data.

In portion (A) of FIG. 3, the auditory language data is divided into units A to F, and a playback speed is set for each unit. Moreover, unit D is set to the control portion. The lines from the reference symbol H to each of the units A to F show that the playback speed is set for each unit. The reference symbol L shows that the unit D is set to the control portion.

In the example of FIG. 3, the control portion indicates the portion that should be played back at standard speed.

Portion (B) of FIG. 3 shows an example of the playback speed when playing back auditory language data. In portion (B) of FIG. 3, the user instructs high-speed playback by performing the user operation of "half-listen". Then, the voice playback unit 140, in response to that instruction, performs high-speed playback of the units A to C and the units E to F. In contrast, for the unit D that is set to the control portion, the voice playback unit 140 performs standard playback in accordance with the settings. In portion (B) of FIG. 3, the reference symbol N shows that the user has set "half-listen" to the units A to F.

In portion (B) of FIG. 3, the reference symbols M1 and M3 indicate that high-speed playback (low sound volume) is set for units A to C, E and F. The reference symbol M2 shows that standard playback (high sound volume) is set for unit D.

As described below, the analyzing unit 192 analyzes the auditory language data, and based on the analysis result, the setting unit 194 sets to the control portion the portion with a high possibility of being important among the units of the auditory language data. Thereby, the voice playback unit 140 replays at a comparatively low speed the important portion of the auditory language data (in the example of FIG. 3, it plays back the important portion at standard speed). As a result, the user can easily acquire the desired information.

On the other hand, the voice playback unit 140 plays back the portions that are not set to the control portion at a speed corresponding to the user's instruction. For this reason, it is possible to shorten the playback time of the entire auditory language data by the user instructing a faster playback (high-speed playback in the example of FIG. 3).

Accordingly, the user can perform sorting of the information contained in sound data of unknown content in a shorter time.

The voice playback unit 140 increases the playback sound volume of the control portion. In the example of portion (B) of FIG. 3, the voice playback unit 140 performs playback of the control portion at a comparatively high sound volume. On the other hand, the voice playback unit 140 performs playback of portions other than the control portion at a comparatively low sound volume.

Thereby, the voice playback unit 140 performs high-speed playback of portions other than the control portion. As a result, when the user judges whether or not the desired information exists in portions other than the control portion, it is possible to reduce the risk of the voice that is played back jarring the ears of the user and others in the vicinity. Also, the voice playback unit 140 performs playback of the control portion at a comparatively high sound volume. As a result, the user easily acquires the desired information.

However, a process in which the voice playback unit 140 performs playback of the control portion at a comparatively high sound volume and performs playback of portions other than the control portion at a comparatively low sound volume is not essential. The voice playback unit 140 may perform playback of the control portion and the other portions at the same sound volume.

As another method, the voice playback unit 140 may be made to perform playback of portions other than the control portion at a higher sound volume than during playback of the control portion. Thereby, when performing high-speed playback of portions other than the control portion, the user can easily detect the location that includes the desired information.

The case shall be described of the voice playback unit 140 playing back the control portion at a predetermined volume (a comparatively high sound volume or a comparatively low sound volume). In this case, the voice playback unit 140 may be made to play back portions other than the control portion at a constant sound volume. As another method, the voice playback unit 140 may be made to change the sound volume in accordance with the playback speed instructed by the user.

In the above, a description is given for the case of the voice playback unit 140 playing back the control portion at a comparatively low speed (standard playback in the example of FIG. 3), but it is not limited to this case. The voice playback unit 140 may be made to play back the control portion at a comparatively high speed (high-speed playback in the example of FIG. 3).

For example, the setting unit 194 sets to the control portion a portion with a comparatively low possibility of being important among the units of the auditory language data. Thereby, when the user listens to the auditory language data by the spoken voice, the voice playback unit 140 can play back at a comparatively high speed the portion with a comparatively low possibility of being important. By performing playback in this manner, it is possible to shorten the playback time of the entire auditory language data.

On the other hand, for a portion that has not been set to the control portion that is a portion with a high possibility of being important, the voice playback unit 140 performs playback at a playback speed corresponding to the user's instruction. Thereby, by causing playback at a comparatively low speed of a portion judged as including the desired information among portions with a high possibility of being important (standard playback in the example of FIG. 3), the user can acquire the desired information.

Returning to FIG. 1 the description shall be continued. The display unit 130 may have a display screen such as a liquid crystal panel or an organic EL (organic electroluminescence) panel. The display unit 130 displays various images such as moving images, still images, and text (that is, characters). In particular, the display unit 130 displays auditory language data by text in a scrollable manner. Moreover, the display unit 130 performs scrolling of the display so as to display by text the portion of the auditory language data that the voice playback unit 140 is playing back.

Thereby, the user can confirm by sight as well the auditory language data that the voice playback unit 140 is playing back. For example, even in the case of the auditory language data played back by the voice playback unit 140 being inaudible due to the effects of ambient noise or the like, the user can still confirm it by the text displayed in the display unit 130.

Also, the user can confirm the content of the auditory language data by the spoken voice that the voice playback unit 140 outputs. For this reason, it is possible to acquire the desired information without continuing to view the display unit 130.

However, it is not essential for the display unit 130 to display the auditory language data by text in a scrollable manner. For example, the playback apparatus 100 may be constituted without including the display unit 130.

The operation input unit 150 may have an input device such as a touch sensor constituting a touch panel that is provided for example in the display screen of the display unit 130. The operation input unit 150 receives user operations.

The control unit 190 executes various functions by controlling each unit of the playback apparatus 100. The control unit 190 may be realized by for example the CPU (central processing unit) that the playback apparatus 100 has reading out and executing programs from a storage device that the playback apparatus 100 has.

The communication control unit 191 controls the communication unit 110 to cause the communication unit 110 to perform communication.

The display control unit 193 controls the display unit 130 to cause the display unit 130 to display various images.

The application execution unit 196 executes various application programs.

The detecting unit 195 detects user operations that the operation input unit 150 has received. In particular, the detecting unit 195 detects user instructions for playback speed.

It is possible to use various operations as a user operation to instruct playback speed. For example, the operation input unit 150 may have an input key for each playback speed (a push button or an icon displayed on the screen) or input keys for increasing/decreasing the playback speed. The detecting unit 195 may detect a key operation on those input keys as a user operation instructing playback speed.

As another method, the operation input unit 150 may have a dial switch for switching the playback speed. The detecting unit 195 may detect a dial operation on that dial switch as a user operation instructing playback speed.

As another method, the display unit 130 may display a scroll bar or slider switch showing the current playback position in the playback time of the entire auditory language data. The detecting unit 195 may detect as a user operation instructing playback speed a touch operation on the scroll bar or slider switch (scroll operation or slider operation).

In particular, the case shall be described of the display unit 130 scroll-displaying the auditory language data by text, and performing scrolling of the display so as to display the portion that the voice playback unit 140 is playing back. In this case, the detecting unit 195 may detect as a user instruction of playback speed a scroll operation on the display of the display unit 130.

Thereby, there is no need for the user to separately perform a scroll operation on the display of the display unit 130 and a user operation instructing the playback speed. On this point, it is possible to save time and labor of the user.

However, the process of the detecting unit 195 detecting a user instruction of playback speed is not essential. For example, the playback apparatus 100 may be constituted without including the detecting unit 195. In this case, the voice playback unit 140 performs playback of the auditory language data at a playback speed corresponding to the setting of the control portion. Specifically, in this case, the voice playback unit 140 may play back the control portion at standard speed, and may perform high-speed playback of portions not set to the control portion.

The analyzing unit 192 analyzes the auditory language data that the acquiring unit 120 has acquired. As the analysis that the analyzing unit 192 performs, it is possible to use various analyses. For example, the analyzing unit 192 may perform language analysis of the auditory language data (for example, analysis of the language that is used, syntax analysis, or the like). The analyzing unit 192 may analyze whether or not there is a voice.

As another method, the analyzing unit 192 may analyze the strength of the voice. The analyzing unit 192 may also analyze the pitch of the voice. Moreover, the analyzing unit 192 may perform multiple analyses such as analyzing the strength of the voice and the pitch of the voice. In particular, the case shall be described of the analyzing unit 192 performing syntax analysis of the auditory language data. In this case, the analyzing unit 192 can divide the auditory language data into sentence units such as words, phrases, sentences or paragraphs based on the parsing result, and can make each division a unit of the auditory language data.

Hereinbelow, the case of the analyzing unit 192 analyzing the types of auditory language data shall be described as an example.

For example, the analyzing unit 192 performs a determination of the language of the auditory language data, such as whether the language is English or Japanese, as analysis of the type of auditory language data. Also, the analyzing unit 192 performs a determination of the intended purpose of the auditory language data as analysis of the type of auditory language data. A posting to a social network service (SNS), an article in a newspaper or magazine, a message such as an e-mail may be included in the intended purpose of the auditory language data.

The analyzing unit 192 may determine the type of the auditory language data based on the application program that uses the auditory language data.

A concrete example is given below. A description shall be given for the case of the application execution unit 196 executing a mobile browser application program (a web browser for mobile devices such as mobile terminal equipment) to connect to an SNS site. In this case, the analyzing unit 192 determines that the auditory language data that the application execution unit 196 has acquired and stored in the storage device 121 is an SNS posting.

A description shall be given for the case of the application execution unit 196 executing a mobile browser application program to connect to a site for viewing newspaper articles. In this case, the analyzing unit 192 determines that the auditory language data that the application execution unit 196 has acquired and stored in the storage device 121 is a newspaper article.

A description shall be given for the case of the application execution unit 196 executing a mobile browser application program to connect to website other than an SNS or articles. In this case, the analyzing unit 192 determines that the auditory language data that the application execution unit 196 has acquired and stored in the storage device 121 is a webpage.

A description shall be given for the case of the application execution unit 196 executing an e-mail application program. In this case, the analyzing unit 192 determines that the auditory language data that the application execution unit 196 has acquired and stored in the storage device 121 is an e-mail message.

As another method, the analyzing unit 192 may determine the type of auditory language data based on information other than the application program that uses the application language data. As a concrete example, the analyzing unit 192 may analyze the format of the auditory language data to determine the type of the auditory language data.

The setting unit 194 sets the control portion in the auditory language data based on the analysis result of the analyzing unit 192. For example, the setting unit 194 performs setting of the control portion based on the type of auditory language data.

Figure 4A:
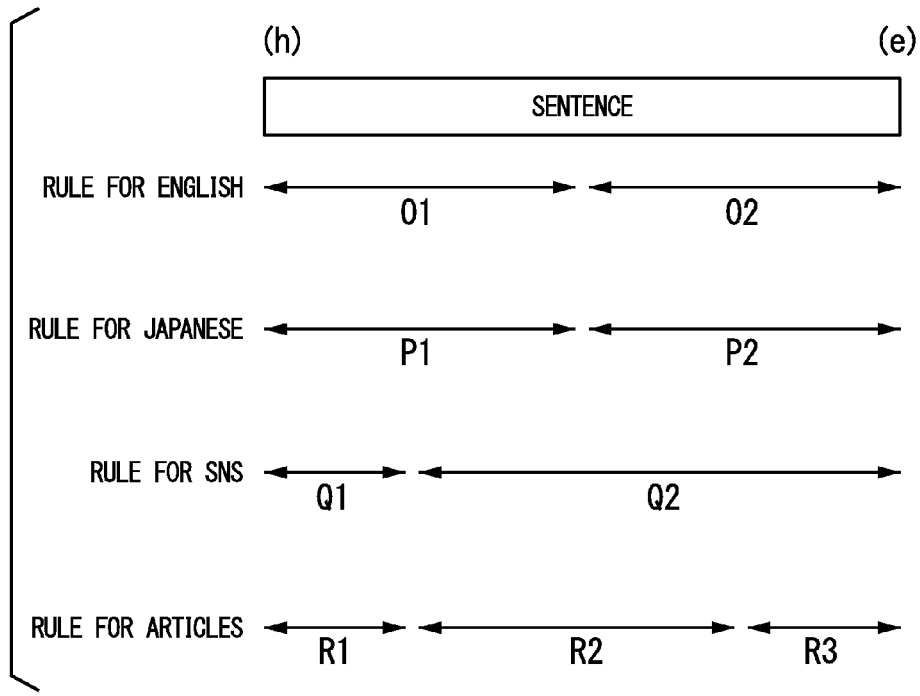
FIG. 4A is an explanatory diagram that shows examples of setting rules for the playback speed control portion for each type of auditory language data in the exemplary embodiment of the present invention.
Figure 4B:
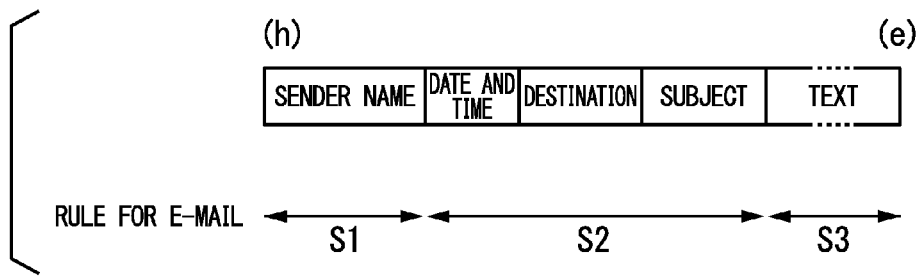
FIG. 4B is an explanatory diagram that shows an example of a setting rule for the playback speed control portion for each type of auditory language data in the exemplary embodiment of the present invention.
Figure 4C:
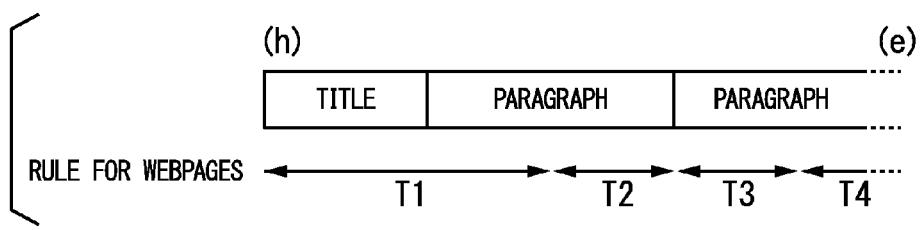
FIG. 4C is an explanatory diagram that shows an example of a setting rule for the playback speed control portion for each type of auditory language data in the exemplary embodiment of the present invention.

FIGS. 4A to 4C are explanatory diagrams showing examples of control portion setting rules for each type of auditory language data.

In FIGS. 4A to 4C, the reference symbol h indicates the beginning. The reference symbol e indicates the end.

Based on the setting rules shown in FIGS. 4A to 4C, the setting unit 194 sets the control portion.

For English-language auditory language data, the setting unit 194 sets the control portion so that the playback speed of the start of a sentence is a comparatively low speed. For example, in the case of the control portion indicating a portion for performing standard playback, the setting unit 194 sets a unit positioned at the beginning of a sentence to the control portion. Thereby, the unit positioned at the beginning of a sentence is inhibited from being played back at high speed.

In FIG. 4A, the reference symbol O1 indicates a portion in which, as a setting rule for English, the playback speed is preferably "slow". The reference symbol O2 indicates a portion in which, as a setting rule for English, the playback speed is preferably "fast".

In an English sentence, the important content is often contained at the beginning of a sentence. Therefore, for example, by the setting unit 194 setting the control portion to a unit positioned at the beginning of a sentence, the voice playback unit 140 plays back the beginning of the sentence at a comparatively low speed. As a result, the user can easily acquire the desired information. A unit here may be a paragraph, or may be a sentence.

The setting unit 194 may set the control portion so that for each sentence in which words or phrases serve as units, the playback speed of a unit positioned at the beginning becomes a comparatively low speed. In English sentences, the important content is often contained at the beginning of a sentence, such as the predicate being arranged following the subject, and a negative being arranged at the beginning of a sentence. Therefore, the setting unit 194 sets the control portion so that the playback speed of a unit positioned at the beginning of a sentence becomes a comparatively low speed. Also, the voice playback unit 140 plays back the beginning of a sentence at a comparatively low speed. As a result, the user can easily acquire the desired information.

As another method, the setting unit 194 may set the control portion so that for each paragraph, in which sentences serves as units, the playback speed of the unit positioned at the beginning of the paragraph becomes a comparatively low speed.

For Japanese-language auditory language data, the setting unit 194 sets the control portion so that the playback speed at the end of a sentence becomes a comparatively low speed. For example, in the case of the control portion indicating a portion for performing standard playback, the setting unit 194 sets a unit positioned at the end of a sentence to the control portion. Thereby, the unit positioned at the end of a sentence is inhibited from being played back at high speed.

In FIG. 4A, the reference symbol P1 indicates a portion in which, as a setting rule for Japanese, the playback speed is preferably "fast". The reference symbol P2 indicates a portion in which, as a setting rule for Japanese, the playback speed is preferably "slow".

In a Japanese sentence, the important content is often contained at the ending of a sentence. Therefore, for example, by the setting unit 194 setting the control portion to a unit positioned at the end of a sentence, the voice playback unit 140 plays back the ending of the sentence at a comparatively low speed. As a result, the user can easily acquire the desired information. A unit here may be a paragraph, or may be a sentence.

The setting unit 194 may set the control portion so that for each sentence in which words or phrases serve as units, the playback speed of a unit positioned at the end becomes a comparatively low speed. In Japanese sentences, the important content is often contained at the end of a sentence, such as the predicate and the negative being arranged at the end of a sentence. Therefore, the setting unit 194 sets the control portion so that the playback speed of a unit positioned at the end of a sentence becomes a comparatively low speed. Also, the voice playback unit 140 plays back the ending of a sentence at a comparatively low speed. As a result, the user can easily acquire the desired information.

As another method, the setting unit 194 may set the control portion so that for each paragraph, in which sentences serves as units, the playback speed of the unit positioned at the end of the paragraph becomes a comparatively low speed.

For auditory language data of SNS posts, the setting unit 194 sets the control portion so that the playback speed at the end of a sentence becomes a comparatively low speed.

In FIG. 4A, the reference symbol Q1 indicates a portion in which, as a setting rule for SNS, the playback speed is preferably "fast" and the sound volume is preferably "low". The reference symbol Q2 indicates a portion in which, as a setting rule for SNS, the playback speed is preferably "slow" and the sound volume is preferably "high".

In SNS postings, the beginning of a sentence is often not very important. Accordingly, the important content is often contained rather at the end of a sentence. Therefore, the setting unit 194 sets the control portion so that the playback speed of units positioned at the end of a sentence becomes a comparatively low speed. Also, the voice playback unit 140 plays back the end of a sentence at a comparatively low speed. As a result, the user can easily acquire the desired information. A unit here may be a paragraph, or may be a sentence. In the case of a short posting, phrases may serve as units.

For auditory language data of articles of newspapers and magazines and the like, the setting unit 194 sets the control portion so that the playback speed around the middle of a sentence becomes a comparatively low speed.

The reference symbols R1 and R3 indicate portions in which, as a setting rule for articles, the playback speed is preferably "fast" and the sound volume "low". The reference symbol R2 indicates a portion in which, as a setting rule for articles, the playback speed is preferably "slow" and the sound volume "high."

Newspaper and magazine articles often come to the point at around the middle of a sentence. Accordingly, the important content is often contained rather around the middle of a sentence. Therefore, the setting unit 194 sets the control portion so that the playback speed of units positioned around the middle of a sentence become a comparatively low speed. Also, the voice playback unit 140 plays back the middle region of a sentence at a comparatively low speed. As a result, the user can easily acquire the desired information. A unit here may be a paragraph, or may be a sentence.

For auditory language data of messages such as e-mail, the setting portion 194 sets the control portion so that the playback speed of the sender and the body becomes a comparatively low speed.

In FIG. 4B, the reference symbols S1 and S3 indicate units for which, as a setting rule for e-mail, the playback speed is preferably "slow". The reference symbol S2 indicates portions for which, as a setting rule for e-mail, the playback speed is preferably "fast."

The setting unit 194 sets the control portion so that the playback speed of the sender's name becomes a comparatively low speed. Also, the voice playback unit 140 plays back the sender's name at a comparatively low speed. As a result, the user can determine whether or not it is an important message based on the sender's name.

Moreover, the setting unit 194 sets the control portion so that the playback speed of the body becomes a comparatively low speed. Also, the voice playback unit 140 plays back the body at a comparatively low speed. As a result, the user can easily acquire the desired information contained in the body.

For auditory language data of web pages, the setting unit 194 sets the control portion so that the playback speed of the title and beginning of each paragraph becomes a comparatively low speed. Here, it is possible to have sentences in each paragraph serve as units.

In FIG. 4C, the reference symbols T1 and T3 indicate portions in which, as a setting rule for web pages, the playback speed is preferably "slow". The reference symbols T2 and T4 indicate portions in which, as a setting rule for web pages, the playback speed is preferably "fast".

The setting unit 194 sets the control portion so that the playback speed of the title becomes a comparatively low speed. Also, the voice playback unit 140 plays back the title at a comparatively low speed. As a result, the user can determine whether or not it is an important sentence on the basis of the title.

In a web page, important matters are often presented at the beginning of a paragraph, with additional explanations and concrete examples often following. That is to say, in a web page, important content is often contained in the beginning of each paragraph. Therefore, the setting unit 194 sets the control portion so that the playback speed of units positioned at the beginning of each paragraph become a comparatively low speed. Also, the voice playback unit 140 plays back the beginning of each paragraph at a comparatively low speed. As a result, the user can easily acquire the desired information.

The case shall be described of the analyzing unit 192 analyzing the strength of the voice of the auditory language data. In this case, the setting unit 194 may set the control portion so that the playback speed of the portion with a strong voice (that is to say, the portion that is played back at a comparatively high sound volume) becomes a comparatively low speed.

A speaker at times speaks with his voice intensified in order to emphasize an important portion. Accordingly, there is a high possibility of important content being contained in portions with a strong voice. Therefore, the setting unit 194 sets the control portion so that the playback speed of portions with a strong voice become a comparatively low speed. Also, the voice playback unit 140 plays back the portions with a strong voice at a comparatively low speed. As a result, the user can easily acquire the desired information. Here, it is possible to use various units. For example, a word, phrase, or sentence may serve as a unit, or each portion resulting from dividing the auditory language data at every predetermined time may serve as a unit.

The case shall be described of the analyzing unit 192 analyzing whether the pitch of the auditory language data is high or low. In this case, the setting unit 194 may set the control portion so that the playback speed of portions with a high pitch is a comparatively low speed.

Due to a speaker saying important portions with firmness, the pitch of the important portions may rise. Accordingly, there is a high possibility of important content being contained in portions with a high pitch. Therefore, the setting unit 194 sets the control portion so that the playback speed of portions with a high pitch becomes a comparatively low speed. Also, the voice playback unit 140 plays back the portions with a high pitch at a comparatively low speed. As a result, the user can easily acquire the desired information. Here, it is possible to use various units. For example, a word, phrase, or a sentence may serve as a unit. Each portion resulting from dividing the auditory language data at every predetermined time may also serve as a unit.

Next, the operation of the playback apparatus 100 shall be described with reference to FIG. 5.

Figure 5:
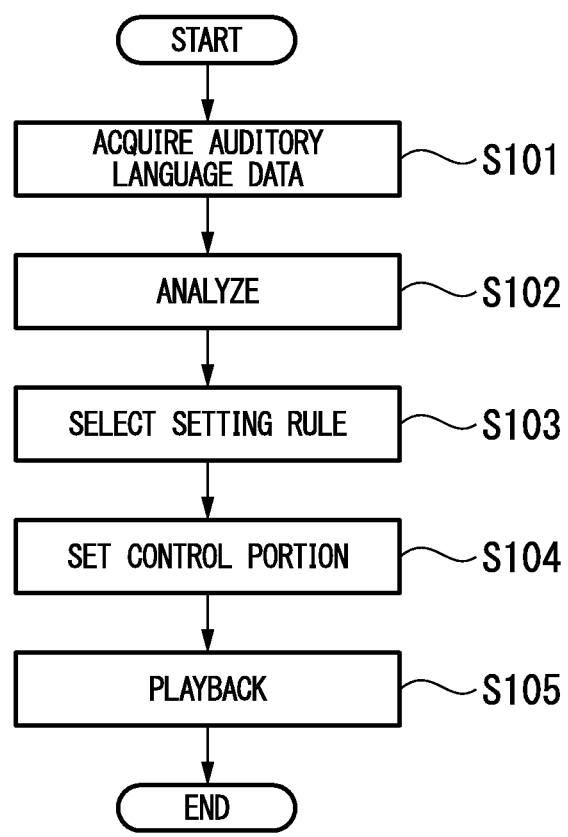
FIG. 5 is a flowchart that shows the processing procedure when the auditory language data playback apparatus performs playback with the playback speed control portion set to auditory language data in the exemplary embodiment of the present invention.

FIG. 5 is a flowchart that shows the processing procedure when the playback apparatus 100 performs playback with a control portion set to the auditory language data. For example, the playback apparatus 100 performs the processing of FIG. 5 upon detecting a user operation requesting playback of auditory language data by spoken voice.

In the processing of FIG. 5, first the acquiring unit 120 acquires the auditory language data, and outputs it to the control unit 190 (Step S101). Specifically, the acquiring unit 120 acquires the auditory language data by reading out auditory language data that the storage device 121 has stored.

In the control unit 190, the analyzing unit 192 analyzes the auditory language data acquired by the acquiring unit 120 (Step S102).

The setting unit 194 selects a setting rule of the control portion on the basis of the analysis result of the analyzing unit 192 (Step S103). The setting unit 194 sets the control portion to the auditory language data in accordance with the selected setting rule. Moreover, the setting unit 194 outputs the auditory language data in which the control portion has been set to the voice playback unit 140 (Step S104).

The voice playback unit 140 plays back the auditory language data from the setting unit 194 in accordance with the control portion that the setting unit 194 has set, and outputs a spoken voice (Step S105).

After that, the processing of FIG. 5 ends.

In the above manner, the analyzing unit 192 analyzes the auditory language data. The setting unit 194 sets the control portion to the auditory language data on the basis of the analysis result of the analyzing unit 192. The voice playback unit 140 plays back the auditory language data in accordance with the setting of the setting unit 194.

Because of the setting unit 194 setting the control portion based on the analysis result of the analyzing unit 192, the voice playback unit 140 can play back at a low speed a portion with a high possibility of including important content of the auditory language data. As a result, the user can easily acquire the desired information. On the other hand, the voice playback unit 140 can play back at high speed portions other than the portion with a high possibility of including important content. As a result, it is possible to shorten the playback time of the entire auditory language data. Accordingly, a user can perform sorting of information contained in sound data of unknown content in a shorter time.

The voice playback unit 140 plays back portions of the auditory language data not set to the control portion at a playback speed corresponding to the user instruction.

As a concrete example, the case of the control portion indicating a portion to be played back at a comparatively slow speed shall be described. In this case, by causing the voice playback unit 140 to play back at a comparatively low speed the portions that have not been set to the control portion and the portion judged as including the desired information, the user can acquire the desired information. On the other hand, the user, by causing the voice playback unit 140 to playback at a comparatively high speed the units judged as not including the desired information, can shorten the playback time of the entire auditory language data.

When the detecting unit 195 detects a user instruction to lower the playback speed, the voice playback unit 140 winds back the playback position and plays back the auditory language data at a reduced playback speed.

As a concrete example, when the detecting unit 195 detects a user instruction to lower the playback speed, the voice playback unit 140 winds back the playback position to the beginning of the unit that includes the current playback position. Moreover, the voice playback unit 140 plays back the auditory language data from the beginning of the unit at a reduced playback speed.

Thereby, since the user can listen to the unit that includes the desired information from the beginning, it becomes easy to acquire the desired information.

As another concrete example, when the detecting unit 195 detects a user instruction lowering the playback speed, the voice playback unit 140 winds back the playback position to a position reaching back to even before the beginning of the unit that includes the present playback position. Moreover, the voice playback unit 140 plays back the auditory language data from the reached-back position at a reduced playback speed.

Thereby, the user can grasp the relation between the unit that includes the desired information and the previous unit, and it becomes easier to acquire the desired information.

The voice playback unit 140 increases the playback sound volume of the control portion.

As a concrete example, the case shall be described of the control portion indicating a portion that should be played back at a comparatively low speed. In this case, when the user is searching for the location that includes the desired information by making the playback apparatus 100 perform high-speed playback of the auditory language data, the risk of the generated voice that is played back jarring the ears of the user or others in the vicinity can be lowered. On the other hand, by the voice playback unit 140 performing playback at a comparatively high sound volume of the location that includes the information the user desires, the user easily acquires the desired information.

As another concrete example, the case shall be described of the control portion indicating a portion that should be played back at high speed. In this case, during playback at a comparatively high speed, the user can easily detect the location that includes the desired information.

The display unit 130 displays the auditory language data by text in a scrollable manner, and the detecting unit 195 detects a scroll operation with respect to the auditory language data that the display unit 130 displays as a user instruction of playback speed.

Thereby, there is no need for the user to separately perform a scroll operation on the display of the display unit 130 and a user operation instructing the playback speed. On this point, it is possible to save time and labor of the user.

The display unit 130 performs scrolling of the display so as to display by text the portion of the auditory language data that the voice playback unit 140 is playing back.

Thereby, the user can confirm by sight as well the auditory language data that the voice playback unit 140 is playing back. For example, even in the case of the auditory language data played back by the voice playback unit 140 being inaudible due to the effects of ambient noise or the like, the user can still confirm it by the text displayed in the display unit 130.

Also, the user can confirm the content of the auditory language data by the spoken voice that the voice playback unit 140 outputs. For this reason, the user can acquire the desired information without continuing to view the display unit 130.

The setting unit 194 performs setting of the control portion based on the type of the auditory language data.

Thereby, the setting unit 194, in accordance with the type of auditory language data, can set the control portion so as to play back at a comparatively low speed a portion with a high possibility of including important content.

The analyzing unit 192 determines the type of the auditory language data based on the application program using the auditory language data.

Thereby, the analyzing unit 192 can determine the type of auditory language data by the simple process of determining the application program that uses the auditory language data.

Figure 6:
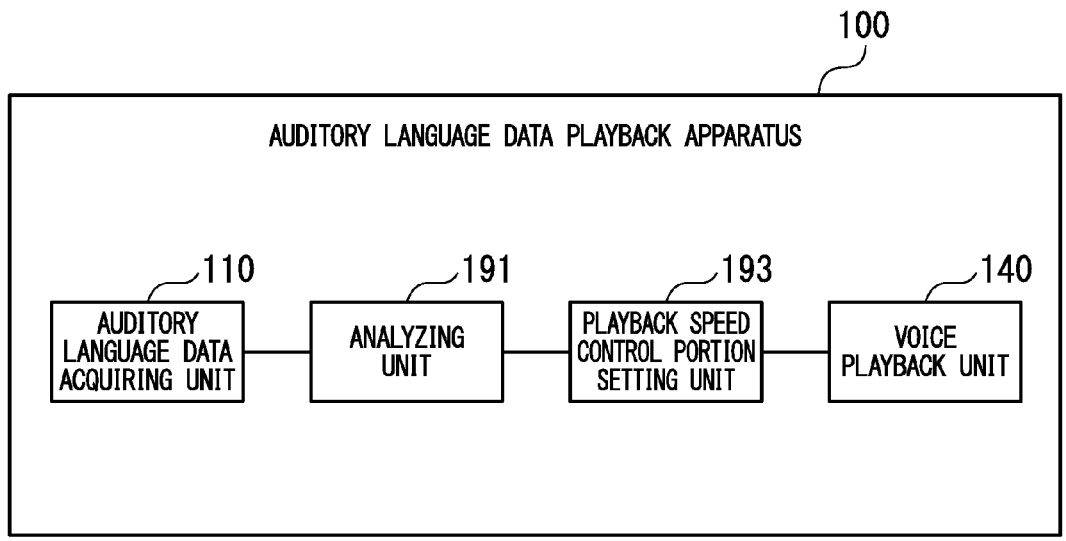
FIG. 6 is a schematic block diagram that shows principal units of an auditory language data playback apparatus in another exemplary embodiment of the present invention.

Next, referring to FIG. 6, principal portions of the auditory language data playback apparatus 100 in the exemplary embodiment of the present invention shall be described.

FIG. 6 is a schematic block diagram that shows principal portions of the playback apparatus 100 in the exemplary embodiment of the present invention. In FIG. 6, among the units of the playback apparatus 100 shown in FIG. 1, the acquiring unit 120, the analyzing unit 192, the setting unit 194, and the voice playback unit 140 are shown.

In the constitution shown in FIG. 6, the acquiring unit 120 acquires the auditory language data. The analyzing unit 192 analyzes that auditory language data. The setting unit 194 sets the control portion to the auditory language data based on the analysis result of the analyzing unit 192. The voice playback unit 140 plays back the auditory language data in accordance with the setting of the setting unit 194.

Thereby, similarly to the case of the constitution shown in FIG. 1, the user can perform sorting of information contained in sound data of unknown content in a shorter time.

Figure 7:
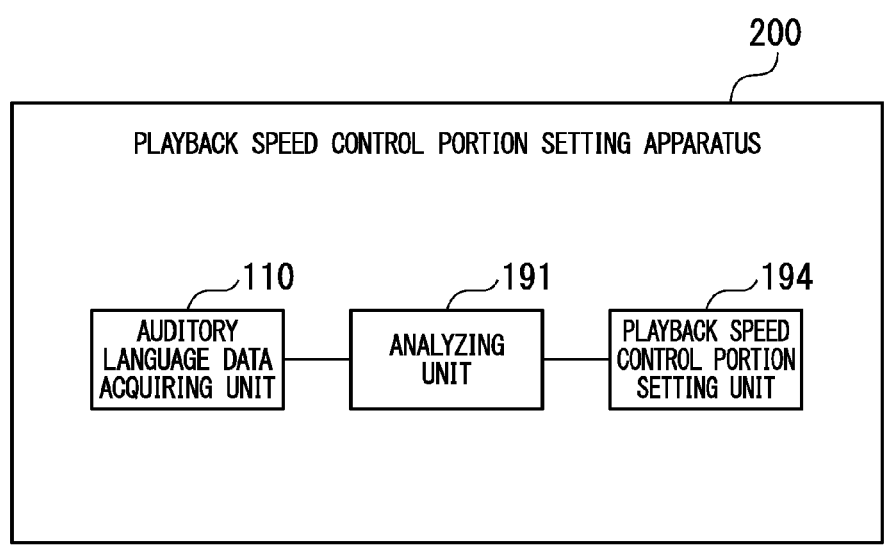
FIG. 7 is a schematic block diagram that shows the functional constitution of a playback speed control portion setting apparatus in still another exemplary embodiment of the present invention.

Next, referring to FIG. 7, a playback speed control portion setting apparatus (high-speed playback restrained setting apparatus) 200 shall be described.

FIG. 7 is a schematic block diagram that shows the functional constitution of a playback speed control portion setting apparatus (hereinbelow, simply sometimes referred to as "setting apparatus") 200 in the exemplary embodiment of the present invention. In FIG. 7, among the units of the playback apparatus 100 shown in FIG. 1, the acquiring unit 120, the analyzing unit 192, and the setting unit 194 are shown.

In the constitution shown in FIG. 7, the acquiring unit 120 acquires auditory language data. The analyzing unit 192 analyzes that auditory language data. The setting unit 194 sets the control portion to the auditory language data based on the analysis result of the analyzing unit 192.

The auditory playback data in which the setting unit 194 has set the control portion is made to be played back by a voice playback apparatus. Thereby, similarly to the case of the constitution shown in FIG. 1, the user can perform sorting of information contained in sound data of unknown content in a shorter time.

The function units that the setting apparatus 200 includes are not limited to the function units shown in FIG. 7. The setting apparatus 200 may also include other function units in addition to the units shown in FIG. 7. For example, the setting apparatus 200 may also include a communication unit 110 (refer to FIG. 1).

The processing of each unit may be carried out by recording a program for realizing all or some of the functions of the playback apparatus 100 and the setting apparatus 200 on a computer-readable recording medium, and causing a computer system to read in and execute the program that is recorded on this recording medium. A "computer system" here includes an OS and hardware such as peripheral devices.

The "computer system" also includes a home page presenting environment (or display environment), when utilizing a WWW system.

The "computer readable recording medium" includes a storage device such as a portable medium including a flexible disk, magneto optical disk, ROM, CD-ROM, and also a hard disk or the like incorporated in a computer system. Furthermore, the "computer readable recording medium" includes one that retains a program dynamically for a short period of time like a communication line when a program is to be transmitted via a network such as the Internet or a communication line such as the telephone line, and one that retains a program for a predetermined period of time like a volatile memory in a computer system functioning as a server or client in such a case. The aforementioned program may be one for realizing some of the aforementioned functions. The aforementioned program may be realized in combination with a program already stored in the computer system.

While the exemplary embodiments of the present invention are described above in detail with reference to the drawings, a concrete configuration is not limited to these exemplary embodiments, and design modifications or the like in a range not departing from the scope of the present invention are also included.

This application is based upon and claims the benefit of priority from Japanese patent application No. 2012-240430, filed Oct. 31, 2012, the disclosure of which is incorporated herein in its entirety by reference.

INDUSTRIAL APPLICABILITY

The present invention can be applied to a playback apparatus, a setting apparatus, a playback method, and a program.

REFERENCE SYMBOLS

100: Auditory language data playback apparatus
110: Communication unit
120: Auditory language data acquiring unit
121: Storage device
130: Display unit
140: Voice playback unit
150: Operation input unit
190: Control unit
191: Communication control unit 192: Analyzing unit
193: Display control unit
194: Playback speed control portion setting unit
195: User instruction detection unit
196: Application execution unit
200: Playback speed control portion setting apparatus

What is claimed is:

1. A playback apparatus comprising:
an application execution unit configured to connect to a site to acquire auditory language data including data to be played back as a spoken voice;
an analyzing unit configured to determine a type of the auditory language data based on a type of the site to output an analysis result;
a setting unit configured to set a unit positioned at an end of a sentence included in the auditory language data to a control portion that is played back at a lower speed than a part of the sentence not at the end of the sentence in a case in which it has been determined that the application execution unit is connected to a social network service (SNS) site based on the analysis result; and
a voice playback unit configured to play back the control portion as a spoken voice at a set playback speed.

2. The playback apparatus according to claim 1, comprising:
a detecting unit configured to detect a user instruction of a playback speed,
wherein the voice playback unit is further configured to play back a portion of the auditory language data not set to the control portion at a playback speed corresponding to the user instruction.

3. The playback apparatus according to claim 2,
wherein the instruction detecting unit is further configured to detect a playback speed reduction instruction instructing a reduction of the playback speed as a user instruction, while the auditory language data is being played back at a first playback speed,
the voice playback unit is further configured to wind back the playback position of the auditory language data in a response to the playback speed reduction instruction, and
the voice playback unit is further configured to play back the auditory language data from the wound back playback position at a second playback speed that is slower than the first playback speed.

4. The playback apparatus according to claim 3,
wherein the auditory language data comprises a plurality of units including a first unit,
the instruction detecting unit is further configured to detect a speed reduction instruction that instructs a reduction of playback speed as a user instruction while the first unit is being played back at a first playback speed, and
the voice playback unit is further configured to play back the auditory language data from a beginning of the first unit at a second playback speed that is slower than the first playback speed, in a response to the speed reduction instruction.

5. The playback apparatus according to claim 3,
wherein the auditory language data comprises a plurality of units including a first unit;
the instruction detecting unit is further configured to detect a speed reduction instruction that instructs a reduction of playback speed as a user instruction while the first unit is being played back at a first playback speed, and
the voice playback unit is further configured to play back the auditory language data from a playback position that is earlier than a beginning of the first unit at a second playback speed that is slower than the first playback speed, in a response to the speed reduction instruction.

6. The playback apparatus according to claim 1, wherein the voice playback unit is further configured to increase playback sound volume of the control portion.

7. The playback apparatus according to claim 2, further comprising:
a display unit configured to display the auditory language data by text in a scrollable manner;
wherein the detecting unit is further configured to detect a scroll operation with respect to the auditory language data displayed by the display unit as a user instruction of the playback speed.

8. The playback apparatus according to claim 7, wherein the display unit is further configured to perform scrolling of display so as to display by text a portion of the auditory language data that the voice playback unit is playing back.

9. A setting apparatus comprising:
an application execution unit configured to connect to a site to acquire auditory language data including data to be played back as a spoken voice;
an analyzing unit configured to determine a type of the auditory language data based on a type of the site to output an analysis result; and
a setting unit configured to set a unit positioned at an end of a sentence included in the auditory language data to a control portion that is played back at a lower speed than a part of the sentence not at the end of the sentence in a case in which it has been determined that the application execution unit is connecting to a social network service (SNS) site based on the analysis result.

10. A playback method, executed by at least one processor, comprising:
connecting to a site to acquire auditory language data including data to be played back as a spoken voice;
determining a type of the auditory language data based on a type of the site to output an analysis result;
setting a unit positioned at an end of a sentence included in the auditory language data to a control portion that is played back at a lower speed than a part of the sentence not at the end of the sentence in a case in which it has been determined that the application execution unit is connecting to a social network service (SNS) site based on the analysis result; and
playing back the control portion as a spoken voice at the set playback speed.

11. A non-transitory computer-readable recording medium storing program that causes a computer to execute:
connecting to a site to acquire auditory language data including data to be played back as a spoken voice;
determining a type of the auditory language data based on a type of the site to output an analysis result;
setting a unit positioned at an end of a sentence included in the auditory language data to a control portion that is played back at a lower speed than a part of the sentence not at the end of the sentence in a case in which it has been determined that application execution unit is connecting to a social network service (SNS) site based on the analysis result; and
playing back the control portion as a spoken voice at the set playback speed.

12. The playback apparatus according to claim 1, wherein the analyzing unit is further configured to determine that the auditory language data is a social network service (SNS) posting in a case in which the application execution unit is connecting to an SNS site.

13. The playback apparatus according to claim 1, wherein the analyzing unit is further configured to determine that the auditory language data is a newspaper article in a case in which the application execution unit is connecting to a site for viewing a newspaper article.

14. The playback apparatus according to claim 13, wherein the setting unit is further configured to set a unit positioned around a middle of a sentence to the control portion, in a case in which the auditory language data has been determined to be a newspaper article.

15. The playback apparatus according to claim 1, wherein the analyzing unit is further configured to determine that the auditory language data is a webpage in a case in which the application execution unit is connecting to a website other than an social network service (SNS) and an article.

16. The playback apparatus according to claim 15, wherein the setting unit is further configured to set a title to the control portion, in a case in which the auditory language data has been determined to be a webpage.

* * * * *